Figure 1:
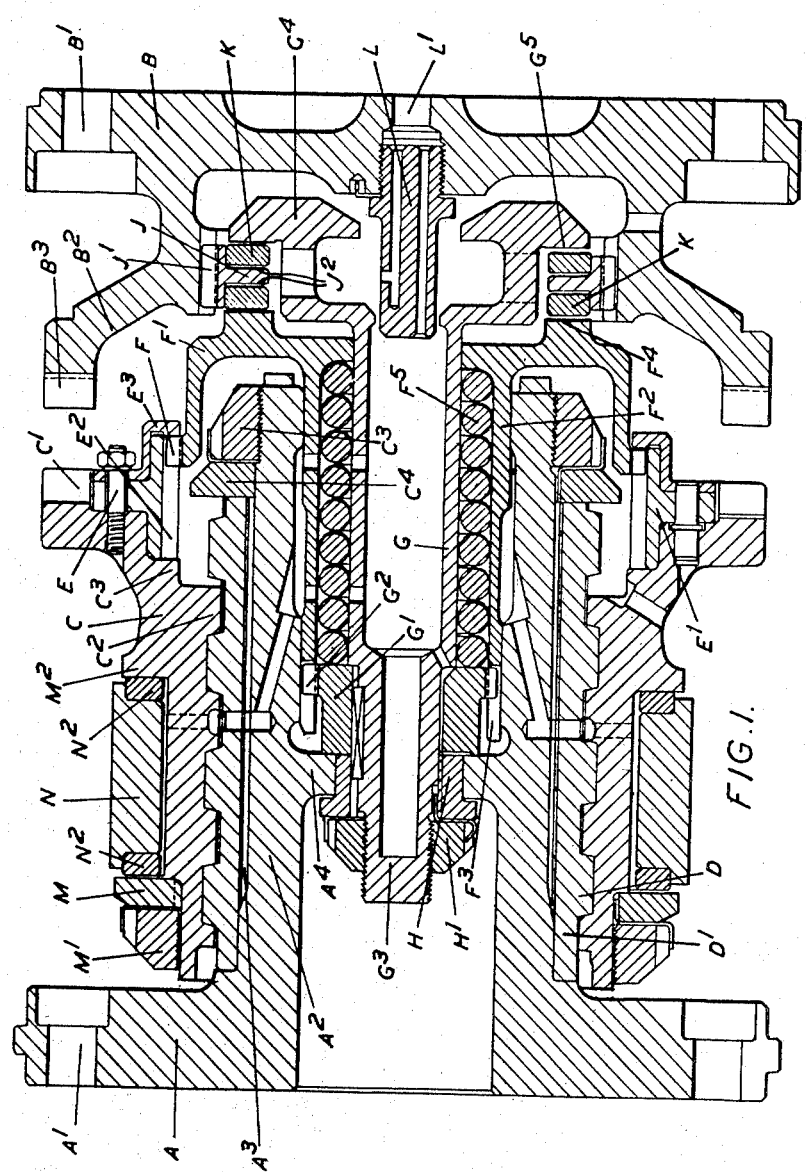

Inventor
Benjamin W. Barlow
Ronald A. Gilbert
By
Emery, Holcombe & Blair
Attorney

2,699,855

UNIDIRECTIONAL TRANSMISSION DEVICE

Benjamin William Barlow, Sudbury, Wembley, and Ronald Albert Gilbert, North Wembley, England, assignors to D. Napier & Son Limited, London, England, a British company Application August 7, 1951, Serial No. 240,722

2 Claims. (Cl. 192—53)

This invention relates to a unidirectional transmission device of the kind comprising driving and driven positive clutch elements connected respectively to driving and driven members and arranged to be engaged and disengaged by movement of one clutch element (hereinafter called the movable clutch element) relatively to the other, the movable clutch element being so connected to its member that limited relative rotation can occur between it and its member and causes it to move relatively to its member for engagement or disengagement with the other clutch element, while a frictional transmission device is arranged for transmission of torque between the two clutch elements whereby relative rotation between the driving and driven members in one direction or the other causes the movable clutch element to rotate and hence move relatively to its member in one direction or the other for engagement or disengagement.

Usually in such unidirectional transmission devices the movement of the movable clutch element is axial, the clutch elements being of the dog or ratchet tooth type and for convenience therefore it will be assumed that the engagement of the clutch elements is caused by axial movement of one relatively to the other although in its broad aspect, the invention could also be applied to unidirectional transmission devices of the kind referred to in which the movable clutch element is constituted by a supporting element carrying a radially movable member or series of members arranged to be moved radially in and out of engagement with holes or notches in the other clutch element by relative rotational movement between the supporting element and the member carrying it.

In unidirectional transmission devices of the kind referred to the engaging friction surfaces of the parts of the frictional transmission device are held in engagement by resilient means at all times when the clutch elements are disengaged with a force sufficient to provide the frictional drag necessary to cause automatic engagement of the clutch elements when the direction of relative rotation of the driving and driven members is reversed, and it is an object of the present invention to provide an arrangement in which, while there will be ample frictional drag for this purpose, the wear and tear on the friction surfaces and the heat which therefore has to be dissipated will tend to be reduced.

In a unidirectional transmission device of the kind referred to according to the present invention, means are provided whereby as the movable clutch element approaches its fully disengaged position it acts to reduce the pressure between the parts carrying the friction surfaces of the frictional transmission device.

It is to be understood that the term "fully disengaged position" is used herein for convenience to signify the position into which the movable clutch element travels when the direction of relative rotation of the driving and driven members is such as to maintain the clutch elements disengaged and that this position will normally be somewhat beyond that at which actual disengagement of the clutch elements occurs.

Thus in a convenient arrangement, in which the parts of the frictional transmission device are held in frictional engagement resiliently as by a spring or springs the axially movable clutch element acts towards the end of its travel onto its fully disengaged position, either directly or indirectly on the part of the frictional transmission device on which the spring or springs act in a direction tending to move it against the action of the spring or springs.

Thus at all times, when the direction of relative rotation between the driving and driven members is such that the clutch elements are maintained out of engagement, the friction between the parts of the frictional transmission device is automatically maintained at a substantially fixed predetermined figure, since any increase in this friction automatically increases the tendency for the axially movable clutch element to rotate on its member in a direction to reduce the friction while similarly any reduction in friction automatically produced a tendency for the movable clutch element to rotate through a small angle towards its engaging position thus increasing the friction.

In one convenient arrangement according to the invention the unidirectional transmission device comprises driving and driven positive clutch elements of the dog or ratchet tooth type, one of which is rigidly connected to a driving or driven member while the other is connected to the other of these members through a quick pitch screw thread or like device, whereby relative rotation between such element and its member causes axial movement of the element for engagement or disengagement of the two elements, a frictional transmission device comprising a friction member fixed to the fixed clutch element and a movable friction member connected to the movable clutch element so as to rotate therewith, but be axially movable relatively thereto, a spring or springs acting on the movable friction member to maintain it in engagement with the fixed friction member, and means whereby when the movable clutch element approaches the end of its axial movement into its fully disengaged position it acts on the movable fricton member in a direction tending to move it against the action of the spring or springs. Conveniently in such an arrangement there is a simple lost motion connection between the movable clutch element and the movable friction member, the direction of movement of the clutch element into its disengaged position being opposite to that in which the spring tends to move the movable friction member.

Figure 2:
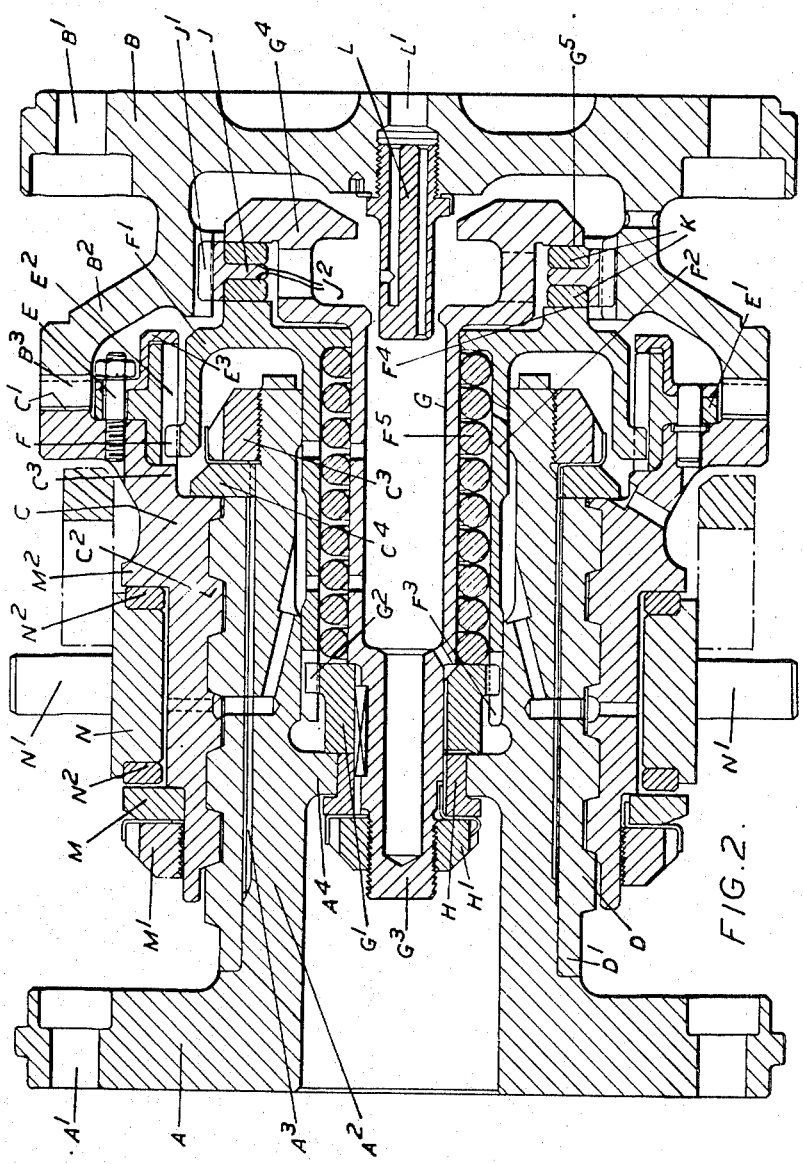

A unidirectional transmission device according to the invention may be used alone simply as a unidirectional or free-wheel device, or may be embodied in or used in conjunction with a power plant or power transmission mechanism in which it comes into and out of operation automatically according to the relative speeds at which its driving and driven members are caused to rotate, for example, as described in the specification of one of the present applicants' co-pending U. S. patent application Ser. No. 241,199 and one form of unidirectional transmission device according to the invention which might be used either as a simple free wheel device or in such a power plant, is illustrated in the accompanying drawings, in which, Figure 1 is a cross section taken in a plane containing the axis of rotation of the device with the parts in the disengaged position, and Figure 2 is a similar view to Figure 1 with the parts in the engaged position.

The unidirectional transmission device shown in the drawings comprises co-axial driving and driven members A and B arranged to be connected respectively to driving and driven shafts as by means of bolts passing through holes $A^1$, $B^1$ therein. The driven member B has formed integral with it a part $B^2$ carrying one half $B^3$ of a dog clutch, hereinafter called the driven dog clutch element. The other or driving half of the dog clutch is formed on the adjacent end face of a sleeve member C as shown at $C^1$. The sleeve member C has a quick-pitch screwthread, indicated at $C^2$, formed in its bore and engaging a corresponding quick-pitch screw thread D upon a sleeve $D^1$ which is rigidly secured by means of a ring nut $C^3$ and a washer member $C^4$ to a boss portion $A^2$ of the member A. The sleeve $D^1$ is held from rotation relatively to the boss $A^2$ by splines indicated at $A^3$ and, functionally, forms a part of the driving member A, the composite construction being adopted only for convenience of manufacture.

The sleeve C has secured to its righthand end by bolts E a ring-like part $E^1$ of T-shaped cross section, the interior of which is formed with internal splines $E^2$, the ends of the grooves between the splines being closed respectively by a part $C^5$ of the sleeve C and by a separate annular collar $E^3$. The internal splines are engaged by external splines F on a member $F^1$, hereinafter called the driving friction clutch member. The member $F^1$ has a boss portion $F^2$ which extends into and is slidably and rotatably mounted within a bore in the part $A^2$ of the driving member A, the inner end of the boss portion $F^2$ being formed with longitudinal splines or slots $F^3$. Mounted so as to be free to slide axially within the bore of the boss portion $F^2$ is a hollow shaft-like member G on the inner end of which is rigidly mounted an annular connecting piece $G^1$ having external splines $G^2$ which engage the splines or slots $F^3$ so that relative axial movement but not relative rotation can take place between the members $F^1$ and G. The inner end of the member G is also connected to the part $A^2$ of the driving member to permit relative rotation thereof but to prevent relative axial movement of one with respect to the other by means of a bushing H lying within a bore in an internal flange $A^4$ on the part $A^2$ and a nut $H^1$ engaging a screwthreaded section $G^3$ at the extreme inner end of the member G.

The outer end of the member G is provided with a flange-like portion $G^4$ having an annular friction surface $G^5$ which lies opposite to but is spaced from an annular friction surface $F^4$ on the member $F^1$.

Interposed between the two friction surfaces $G^5$ and $F^4$ which constitute driving friction surfaces is an annular element J constituting a driven frictional element provided with external splines as indicated at $J^1$, by which it is connected to the driven member B so as to be held from rotation but free to slide axially relatively to that member. Interposed between each of two friction faces $J^2$ on the member J and the adjacent friction face $F^4$ or $G^5$ is an annular disc K of friction material so that the parts $F^4$, $G^5$, J and K together form a friction clutch device.

A lubricant distributing nozzle device indicated at L is provided by which lubricant can be fed from a bore $L^1$ in the driven member B to the friction surfaces referred to and to the interior of the member G from which it flows through suitable passages to the various relatively movable engaging surfaces of the parts of the complete transmission device, including those of the quick-pitch screwthread.

The sleeve C has secured to one end thereof a ring-like part M by means of a nut $M^1$, which ring-like part in association with a shoulder $M^2$ on the sleeve C forms a circumferential groove in which lies a thrust collar N provided with trunnions $N^1$ and having anti-friction thrust members $N^2$ at its ends the purpose of this thrust collar N being to enable the sleeve C to be held from axial movement relatively to the driving member A when desired, for example by mechanism of the kind described in the above mentioned patent application Ser. No. 241,199.

A spring $F^5$ lying in an annular space between the boss portion $F^2$ and the member G and acting at its ends respectively on the member $F^1$ and the member $G^1$ tends always to move the member $F^1$ to the right and thereby to cause the frictional members J and K to be frictionally gripped between the friction surfaces $F^4$, $G^5$ and $J^2$.

In operation assuming the collar N is free to move axially as long as the driving member A is rotating relatively to the driven member B in a direction to disengage the driving dog clutch elements $B^3$ and $C^1$, the frictional drag imposed by the engagement of the frictional surfaces of the friction clutch device $F^4$, $G^5$, J and K, acting through the member $F^1$ and the splines F and $E^2$ on the sleeve C, tends to rotate this sleeve on the member A in a direction causing it to move to the left, and the parts will occupy the positions shown in Figure 1 with the flange member $E^3$ acting on the ends of the splines F in a direction tending to move the member $F^1$ to the left and thereby cause disengagement of the surfaces of the friction clutch device. In Figure 1 the spaces shown between the friction members K and the frictional surfaces $F^4$, $G^5$ and $J^2$ are much exaggerated. Since the disengaging force thus acting on the ends of the splines F is dependent upon the frictional drag imposed by the engaging friction surfaces of the friction clutch device under the influence of the spring $F^5$, it will be seen that the result of the action of the flange member $E^3$ on the ends of the splines F under this condition will be to ensure that the frictional drag between the friction surfaces remains at a substantially constant predetermined figure since any tendency for the drag to increase will correspondingly increase the disengaging force and vice versa.

If and when the rotation of the driving member A relatively to the driven member B starts in the opposite direction, frictional drag will occur in the opposite direction causing the sleeve C to rotate so as to move to the right. Thus the flange member $E^3$ will move out of engagement with the splines F and the frictional drag will at once become directly dependent solely upon the force applied by the spring $F^5$ and the sleeve C will thus then rotate on the part $A^2$ and thus move to the right until the dogs $C^1$ come into engagement with the dogs $B^3$, after which these dogs will be forced into and held in full engagement by the torque transmitted through them and the parts will achieve and occupy the positions shown in Figure 2 as long as the direction of torque remains unchanged.

Immediately there is any reversal of the direction of torque it will be seen that the sleeve C will be rotated again upon the part $A^2$ first by reaction between the dogs until they disengage, and thereafter by reason of the frictional drag in the friction clutch device until the parts again occupy the disengaged position shown in Figure 1 in which the frictional drag in the frictional clutch device is maintained at substantially the predetermined constant by engagement of the flange member $E^3$ with the ends of the splines F.

What we claim as our invention and desire to secure by Letters Patent is:

1. A unidirectional transmission device comprising driving and driven positive clutch elements of the dog or ratchet type one of which is rigidly connected to a driving or driven member while the other is connected to the other of these members through a quick-pitch screw-thread or like device whereby relative rotation between such element and its member causes axial movement of the element for engagement or disengagement of the elements, a frictional transmission device comprising at least one friction member fixed to the fixed clutch element and a movable friction member connected to the movable clutch element so as to rotate therewith but be axially movable relative thereto, a spring or springs acting axially on the movable friction member to maintain it in engagement directly or through a frictional element with the fixed friction member, and means on the movable clutch element for acting on the movable friction member to tend to move it against the action of the spring or springs as the movable clutch element approaches the end of its axial movement into its fully disengaged position, said means including a simple lost motion connection between the movable clutch element and the movable friction member, the direction of movement of the movable clutch element into its disengaged position being opposite to the direction in which the spring tends to move the movable friction member.

2. A unidirectional transmission device comprising driving and driven positive clutch elements of the dog type, means connecting one of such elements rigidly to the appropriate driving or driven member, a quick-pitch screw-thread on the other of said elements co-axial with its axis of rotation, a co-operating quick-pitch screw-thread engaging the quick-pitch screwthread on the said element and rigid with the other of said members, frictional parts rotationally rigid respectively with the driving and driven members and having formed thereon annular friction faces, at least one spring exerting a force axially and tending always to cause such faces to approach one another and thus maintain a frictional drive between the driving and driven elements, the connection between the element having the quick-pitch screwthread thereon, and its associated frictional part permitting relative axial movement between said clutch element and said part, and an abutment on the said element which towards the end of its travel along its quick-pitch screw-thread in a direction causing disengagement of the positive clutch elements acts upon the said part in a direction opposite to that in which the said spring acts.

References Cited in the file of this patent

FOREIGN PATENTS

| | | |
|---|---|---|
| 180,147 | Switzerland | Jan. 2, 1936 |
| 601,939 | Germany | Aug. 28, 1934 |
| 674,934 | Germany | Apr. 25, 1939 |